United States Patent Office 2,799,640
Patented July 16, 1957

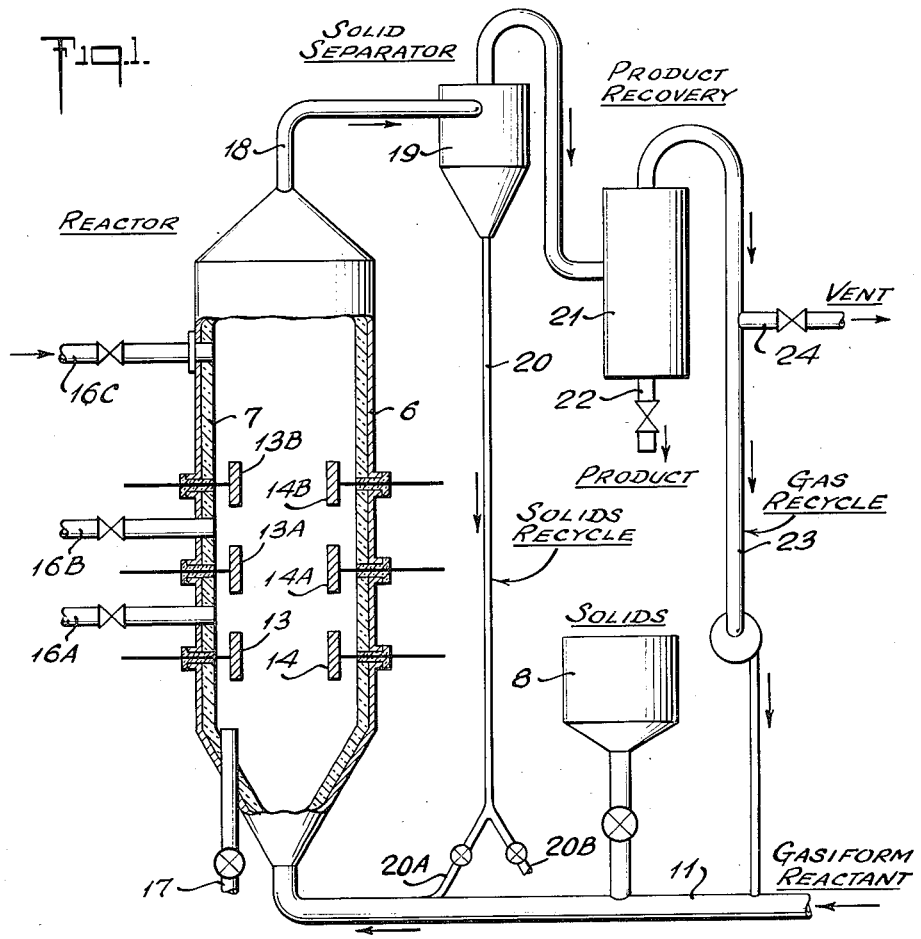
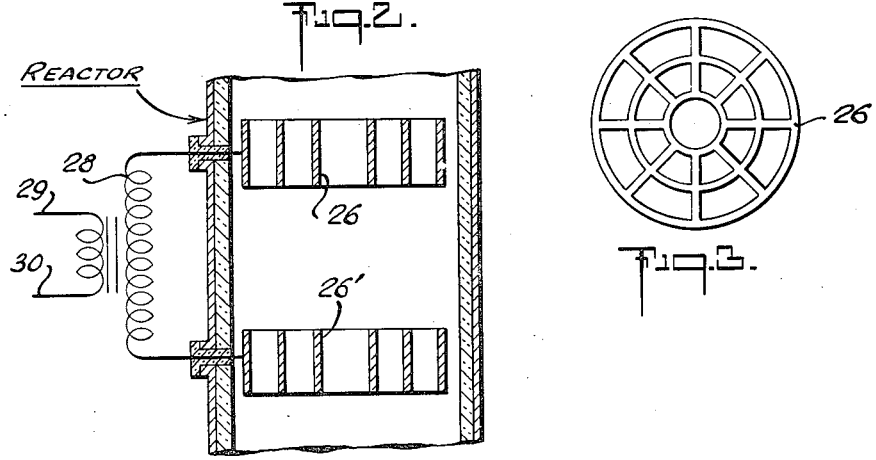

2,799,640

SPARK DISCHARGE ACTIVATED CHEMICAL REACTIONS

Ernest F. Pevere, Beacon, Howard V. Hess, Glenham, and George B. Arnold, Fishkill, N. Y., assignors to The Texas Company, New York, N. Y., a corporation of Delaware Application December 31, 1953, Serial No. 401,671

7 Claims. (Cl. 204—171)

This invention relates to a method and apparatus for conducting chemical reactions which are activated by electrical spark discharges.

A number of chemical reactions are known which are catalyzed by electric spark discharge. For example, it is known that acetylene may be produced from gaseous hydrocarbons more saturated than acetylene by passing the more saturated hydrocarbon through an electric arc or spark discharge. Similarly, hydrazine may be produced from ammonia, and hydrogen cyanide, from nitrogen and a gaseous hydrocarbon.

We have devised a novel process for conducting reactions in an electric spark discharge. By the process of our invention it is possible, not only to conduct reactions between gaseous reactants, but also, between solids and gases, between solids and vapors, and between gases and vapors. In addition to the specific examples mentioned above, our method of producing electric spark discharges may be employed, for example, in conjunction with hydrogenation of coal, hydrogenation of hydrocarbons, and partial oxidation of carbonaceous fuels.

In accordance with our invention, the reactants undergoing treatment are subjected to the action of a spark discharge in a reactor containing a fluidized bed of electrically conductive solid particles. Carbon, for example, is suitable as an electrically conductive solid for use in the process of our invention. Numerous other solids may be used as, for example, high melting point metals including tungsten and tantalum, various metal carbides, and electrically conductive metal oxides, and salts.

The fluidization of solids is well known in the prior art. It is known that when a fluid is passed upwardly through a mass of solid particles, at a velocity sufficient to lift or support particles, the particles are set in motion. It is possible to adjust the velocity of flow of the fluid, usually a fluidizing gas, so that the entire mass of particles is agitated but only a small proportion of the particles are entrained in the gas stream and carried from the bed. This state is known as dense phase fluidization, and the mass of particles are referred to as a fluidized bed. A fluidized bed resembles in appearance a boiling liquid; the mass exhibits other characteristics of a liquid, particularly mobility, hydrostatic pressure, and an upper surface or boundary above which the concentration of solid particles in the fluid is markedly reduced. It is also possible to adjust the velocity of flow of the fluid so that the solid particles are substantially completely entrained in the fluid. Under these conditions, a substantially uniform concentration of solid particles exists throughout the fluid and a dispersed suspension of solid particles is obtained. Whether the solid particles are in a fluidized bed or are suspended in the gas stream, they are in a state of fluidization and may be properly referred to as fluidized particles. In carrying out the method of our invention, the solid particles are maintained in the reaction zone as a fluidized bed. A combination of the fluidized bed and dispersed suspension may be employed.

We have found that when an electrical potential is applied between electrodes in contact with fluidized electrically conductive particles, current flows between the electrodes producing a myriad of sparks. The constant motion and shifting of the individual particles relative to one another produce a constantly changing pattern of sparks. The electric current is probably conducted from one electrode to the other through the fluidized particles by a combination of conduction through particles and spark discharge between particles. We have found that our method of producing electric sparks is effective for conducting chemical reactions activated by electric discharge. A number of such reactions are known.

The present invention will be more readily understood by reference to the accompanying drawings.

Fig. 1 is a diagrammatical view, partly in cross section, illustrating one form of apparatus suitable for carrying out the method of our invention.

Fig. 2 is a diagrammatic cross-sectional view of a section of a reactor illustrating another embodiment of apparatus suitable for carrying out the process of our invention.

Fig. 3 is a plan view of an electrode of Fig. 2.

With reference to the drawing, the reactor may suitably comprise a cylindrical vessel having an exterior shell 6, for example, of steel, with an insulating lining 1, for example, glass. Solid particles may be introduced into the system from hopper 8 through line 11. A reactant in gaseous or vapor form is introduced into the lower portion of the vessel through line 11 and passed upwardly therethrough at a rate sufficient to maintain the solid particles in a fluidized state.

The vessel is provided with at least one pair of electrodes 13 and 14. Additional pairs of electrodes, for example, 13A and 14A, 13B and 14B, may also be provided. Between each pair of electrodes is applied an electric potential of sufficient magnitude to produce a flow of electric current therebetween through the fluidized particles.

Additional inlets for reactants may be provided along the path of flow through the reactor as indicated by conduits 16A, 16B, and 16C. In some instances, it may be desirable to add additional amounts of either the solid or gasiform reactant to the system via one or more of the reactant inlets 16A, 16B, and 16C. In other instances, as will be explained hereinafter, it is desirable to add another reactant to the system following the activation of one reactant by the spark discharge.

Solid particles may be withdrawn directly from the reactor through line 17, if desired.

Gases and vapors are discharged from the reactor through line 18, from which they pass to a separator 19. Solid particles contained in the stream discharged from the reactor are separated from the gases and vapors in separator 19. The recovered solids are withdrawn from the separator through line 20 from which they may be returned to the reactor through conduit 20A via line 11, or discarded through conduit 20B. The nature and amount of the solids removed by separator 19 depend upon the type of fluidized system employed in the reactor. The reactor may be operated with a fluidized bed of solids maintained therein in such a manner that there is little entrainment of solids through line 18 or it may be operated so that the solids are suspended and carried through the reactor, or from the reactor, by the gas stream.

Gases and vapors pass from separator 19 to a product recovery system 21.

Gases and vapors are discharged from the reactor through line 18 from which they pass to a separator 19 for recovery of solid particles therefrom and thence to a product recovery system 20. The product recovery system, per se, is not a part of this invention. A typical product recovery system is described in the example. From the product recovery system, the desired product is withdrawn through line 22. Unreacted gases may be passed through line 23 to line 11 and recycled to the reactor. Part, or all, of the stripped gas from the product recovery system may be vented, if desired, through line 24.

In Fig. 1, the electrodes are illustrated as arranged in horizontal pairs. Alternatively and often, preferably, the pairs of vertically spaced electrodes may be used. A suitable arrangement of vertically spaced electrodes is shown in Fig. 2. As illustrated in Fig. 2, a pair of annular electrodes are disposed within the reactor one above the other. An electric potential is impressed across the electrodes from the high voltage winding of a transformer 28. Power is supplied to the primary winding of the transformer through lines 29 and 30.

An advantage of the vertically spaced electrodes illustrated in Fig. 2 is that this arrangement provides good distribution of electric current throughout the entire section of the reactor intermediate the electrode.

Corresponding pairs of electrodes, for example, electrodes 13 and 14, 13A and 14A, and 13B and 14B may be isolated from one another electrically so that the current flows only between each of the respective pairs of electrodes. This may be effected by supplying electrical energy for each pair of electrodes from a separate transformer or from a separate secondary winding of a common transformer. The applied voltage, and hence the current density, between each pair of electrodes may be separately controlled. This has been found desirable in a system of the type illustrated in Fig. 1, particularly when operated with a dense phase fluid bed of particles in the reactor. With this type fluidization, the concentration of particles between the lowermost pair of electrodes, for example, tends to be greater than that between electrodes higher in the bed. The higher concentration of particles, or greater density of the bed, in the lower part of the bed results in higher rates of current flow for any given applied potential.

The following examples illustrate the application of the method of this invention to the production of acetylene by electrical discharge in methane.

A vertical tubular glass reactor comprising a lower section 2 inches in diameter by 27 inches and an upper section 4 inches in diameter by 12 inches is charged with about 100 grams of 70 mesh activated charcoal. Two flat plate electrodes approximately 1½ inches by 2½ inches are placed about 7 inches from the bottom of the reactor. The clearance between electrodes is about 1½ inches. Methane is mixed with gases from the reactor (without intermediate product separation) and passed upward through the bed at about atmospheric pressure. The recycled gas and fresh feed mixture, containing about 50 volumes of recycle gas for each volume of methane feed, is passed upward at a rate sufficient to maintain the charcoal in a state of dense phase fluidization. Power is supplied from a 10 kva. transformer with a 220 v., 45 A. (maximum) primary and a 6000 v., 1.4 A. (maximum) secondary. Provision is made for varying the voltage and current in the primary.

The following runs illustrate the effect of voltage and current density on the production of hydrogen and acetylene from methane.

| Run | Volts [1] (×1,000) | Amps.[2] | Product Gas Analysis [3] | | | |
|---|---|---|---|---|---|---|
| | | | $C_2H_2$ | $H_2$ | $CH_4$ | $N_2$ and $CO$ [4] |
| 1 | 2–3 | 0–5 | 0.4 | 0.9 | 63.0 | 27.8 |
| 2 | 3–4 | 0–5 | 0.3 | 1.4 | 72.5 | 20.0 |
| 3 | 4–5 | 0–5 | 0.2 | 2.6 | 77.8 | 14.2 |
| 4 | 5–6 | 0–5 | 0.5 | 5.0 | 80.6 | 10.5 |
| 5 | 5–6 | 5–10 | 0.8 | 6.9 | 83.1 | 6.5 |
| 6 | 5–6 | 10–20 | 4.9 | 28.1 | 58.4 | 6.1 |
| 7 | 5–6 | 20–30 | 7.3 | 56.7 | 26.5 | 7.8 |
| 8 | 5–6 | 30–40 | 6.1 | 66.7 | 16.3 | 9.3 |

[1] Voltage measured in secondary circuit.
[2] Amperage measured in primary circuit.
[3] Small amounts of hydrocarbons other than those reported make up the balance of the product.
[4] Nitrogen and carbon monoxide in the product gas are indicative of air leakage into the system.

It will be evident from the above table that the best results obtained in this particular instance was run 7 with 5000 to 6000 volts across the electrodes and an average current of the order of 0.73 to 1.1 amperes between electrodes. This corresponds to a field strength or electrical tension of the order of 3000 to 4000 volts per inch and a current density (based upon the area of the electrodes) of the order of 0.2 to 0.3 ampere per square inch. 73.5 mol percent of the methane feed was converted to other products.

For any given system, conditions for most favorable yields of the desired product may be determined by trial.

The method of our invention may be effectively applied to numerous chemical reactions. Another reaction of industrial importance is the production of hydrazine from ammonia. The method may also be applied to production of liquid hydrocarbons by passing natural gas, preferably preheated, through a bed of bituminous or lignite coal activated by passage of an electric current therethrough. Hydrocarbons may be processed in a similar manner. For example, residual oil from crude stills or from cracking operations may be subjected to reaction with hydrogen or with gaseous hydrocarbons in the presence of a suitable solid, e. g., coke derived from the hydrocarbons.

In the production of acetylene from hydrocarbons, it is desirable to separate hydrogen from the recycle gas stream.

In a modification of the method of our invention, gas (or vapors) passes upward through the reaction zone while the solid particles move downward therethrough countercurrent to the gas stream. The particles are continuously introduced into the reactor above the electrodes and withdrawn from the reactor below the electrodes; generally, it is desirable to recirculate the solid particles.

It will be evident that the rate of current flow (and current density) between electrodes may be varied by varying the concentration of solid particles in the region intermediate the electrodes. Other conditions remaining fixed, as the concentration of solid particles increases, the current flow increases.

Obviously, many modifications and variations of the invention, as hereinbefore set forth, may be made without departing from the spirit and scope thereof, and therefore only such limitations should be imposed as are indicated in the appended claims.

We claim:
1. A method of conducting a chemical reaction in an electrical discharge which comprises passing a gasiform reactant upwardly through an elongated reaction zone of restricted cross-sectional area, maintaining a dense phase fluidized bed of electrically conductive solid particles in said reaction zone, applying an electrical potential between a plurality of fixed points along the path of flow of said reactant, said fluidized bed being maintained between said fixed points, said electrical potential having a magnitude sufficient to produce flow of electric current between said points causing electric spark discharges between the solid particles between said points, and continuously discharging resulting products of reaction from the upper portion of said reaction zone.

2. A method as defined in claim 1 wherein said gasiform reactant is subjected to separately controlled electrical discharges at a plurality of points along the path of flow of said reactant.

3. A method as defined in claim 1 wherein said gasiform reactant is a gasiform hydrocarbon.

4. A method for the production of acetylene and hydrogen from a gasiform hydrocarbon which comprises passing said hydrocarbon upwardly through a reaction zone, maintaining a dense phase fluidized bed of electrically conductive carbonaceous solid particles in said reaction zone, producing an electrical field in a predetermined region of said dense phase fluidized bed of the order of 3000 to 4000 volts per inch, and maintaining the concentration of said solid particles in said fluidized bed at an appropriate value to cause an electrical discharge through said dense phase fluidized bed in said region having an average current density of the order of 0.2 to 0.3 ampere per square inch.

5. A method of conducting a chemical reaction in an electrical discharge which comprises maintaining a bed of electrically-conductive solid particles in a reaction zone, passing gasiform reactant upwardly through said bed of solid particles at a rate sufficient to maintain said solid particles as a dense phase fluidized bed, and applying an electrical potential between a plurality of points within said fluidized bed of sufficient magnitude to produce flow of electric current therebetween and cause electric spark discharges between said particles along a plurality of continuously randomly changing paths intermediate said points.

6. A method as defined in claim 5 wherein said reactant is a hydrocarbon.

7. A method as defined in claim 6 wherein said solid particles are carbon.

References Cited in the file of this patent

UNITED STATES PATENTS

| | | |
|---|---|---|
| 2,165,820 | Smyers | July 11, 1939 |
| 2,353,770 | Suits | July 18, 1944 |
| 2,632,731 | Van Ediger | Mar. 24, 1953 |
| 2,731,410 | Weir | Jan. 17, 1956 |